US006769988B1

(12) United States Patent
Sato et al.

(10) Patent No.: US 6,769,988 B1
(45) Date of Patent: Aug. 3, 2004

(54) ENTERTAINMENT UNIT, RECORDING MEDIUM AND METHOD FOR SETTING ITS PARAMETERS

(75) Inventors: Akira Sato, Sapporo (JP); Keima Yamada, Tokyo (JP); Fumiteru Sato, Tokyo (JP); Satoshi Tamaki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 459 days.

(21) Appl. No.: 09/658,422

(22) Filed: Sep. 8, 2000

(30) Foreign Application Priority Data

Sep. 10, 1999 (JP) .......................................... 11-258049
Jan. 13, 2000 (JP) ..................................... 2000-004877
Aug. 24, 2000 (JP) ..................................... 2000-253806

(51) Int. Cl.[7] .......................... A63F 13/00; A63F 9/24; G06F 17/00; G06F 19/00
(52) U.S. Cl. ............................ 463/38; 463/36; 463/37; 463/50; 463/1
(58) Field of Search ........................... 463/1–9, 36–38, 463/40–42, 50

(56) References Cited

U.S. PATENT DOCUMENTS

| 4,480,835 A | | 11/1984 | Williams | |
|---|---|---|---|---|
| 5,649,862 A | | 7/1997 | Sakaguchi et al. | |
| 5,704,837 A | * | 1/1998 | Iwasaki et al. | 463/38 |
| 5,947,819 A | * | 9/1999 | Ohshima | 463/2 |
| 6,007,428 A | * | 12/1999 | Nishiumi et al. | 463/36 |
| 6,354,948 B1 | | 3/2002 | Nagayama | |

FOREIGN PATENT DOCUMENTS

| EP | 0 797 139 A1 | 9/1997 |
|---|---|---|
| EP | 0 988 877 A2 | 3/2000 |
| EP | 0 099 877 A3 | 6/2000 |
| GB | 2 313 432 A | 1/1997 |
| JP | 2969111 B2 | 3/2000 |
| WO | WO 97/14088 A1 | 4/1997 |

OTHER PUBLICATIONS

European Patent Office; "European Search Report"; of corresponding European Patent App. No. EP 00 30 7812; dated May 19, 2003; (3 pages).

Collins; "English Dictionary"; definition of "polar coordinates"; pp. 1185 (one page); 1989.

* cited by examiner

*Primary Examiner*—Teresa Walberg
*Assistant Examiner*—Robert Mendoza
(74) *Attorney, Agent, or Firm*—Fitch, Even, Tabin & Flannery

(57) ABSTRACT

An operation unit provided with an operation axis as an input unit of an entertainment unit is more effectively utilized. An entertainment unit receives input information from an operation unit and calculates a displacement value with respect to the rotation movement of the operation axis around a predetermined standard axis based on the position information of the operation axis included in the input information and based on the displacement value the display condition of the object is changed. In another mode, a first parameter is set based on the tilt angle of the operation axis, and a second parameter is set according to the rotation angle or rotation angular velocity of the operation axis. An evaluation value for the operation object is set based on the first and second parameters, and where either one of the first and second parameters exceeds a predetermined value the evaluation value of the player character may be changed or clearing may occur.

24 Claims, 13 Drawing Sheets

ENTERTAINMENT UNIT, RECORDING MEDIUM AND METHOD FOR SETTING ITS PARAMETERS

BACKGROUND OF THE INVENTION

An operation unit for receiving an input from the user is used in an entertainment unit such as a TV game unit. By operating this operation unit, the user operates player characters displayed on the display screen of the display unit connected to the entertainment unit. As for such operation units, a game controller with direction keys and operation buttons and an analog joy stick having an operation axis etc., for example, are cited. In addition, in recent years, a game controller or the like on which an analog joy stick with an operation lever is mounted have appeared and, therefore, it has become possible for the user to enjoy a variety of games with one game controller.

In the case that a game is executed in a conventional entertainment unit, the operation lever of the analog joy stick is usually used for moving player characters on the display screen and the operation buttons are used for making the player characters on the display screen and starting predetermined actions, such as strength recovery and an attack against the opponents, in a fight game. Then, the evaluation values with respect to the actions of the player characters, such as the extent of strength recovery of the player characters or the extent of the influence of the attack upon the opponent, are usually determined in accordance with the number of hits in a row of the operation button allocated for the action.

SUMMARY OF THE INVENTION

The present invention relates to a technology for effectively utilizing signals outputted from an operation unit with an operation lever such as a joy stick in an entertainment unit. It is an object of the present invention to utilize the operation unit having an operation axis as an input unit of the entertainment unit in a more effective way.

To accomplish the object, according to the present invention, the entertainment unit which receives input information from the operation unit calculates a variable relating to a rotation movement of the operation lever around a preset standard axis based on position information of the operation lever included in the input information from the above described operation unit and changes the display conditions of the objects based on the variable.

Moreover, according to an entertainment unit with respect to another mode of the present invention, the first parameter is set based on the tilt angle of the operation lever created by the user's action which tilts the operation lever of the operation unit and the second parameter is set in accordance with the angle of rotation or the angular velocity of rotation of the operation lever by the user's action which rotates the operation lever of the operation unit. Then, based on the set value of the first parameter and the set value of the second parameter, an evaluation value for the operation object is set. In this case, when either one of the set values of the first or the second parameters exceeds a threshold value an alternation of the evaluation value of the player character, for example clearing, may arise.

DETAILED DESCRIPTION OF THE PREFERRED EMBODIMENTS

A mode according to the present invention is described by citing an example applied to an entertainment unit in the following.

Figure 1:
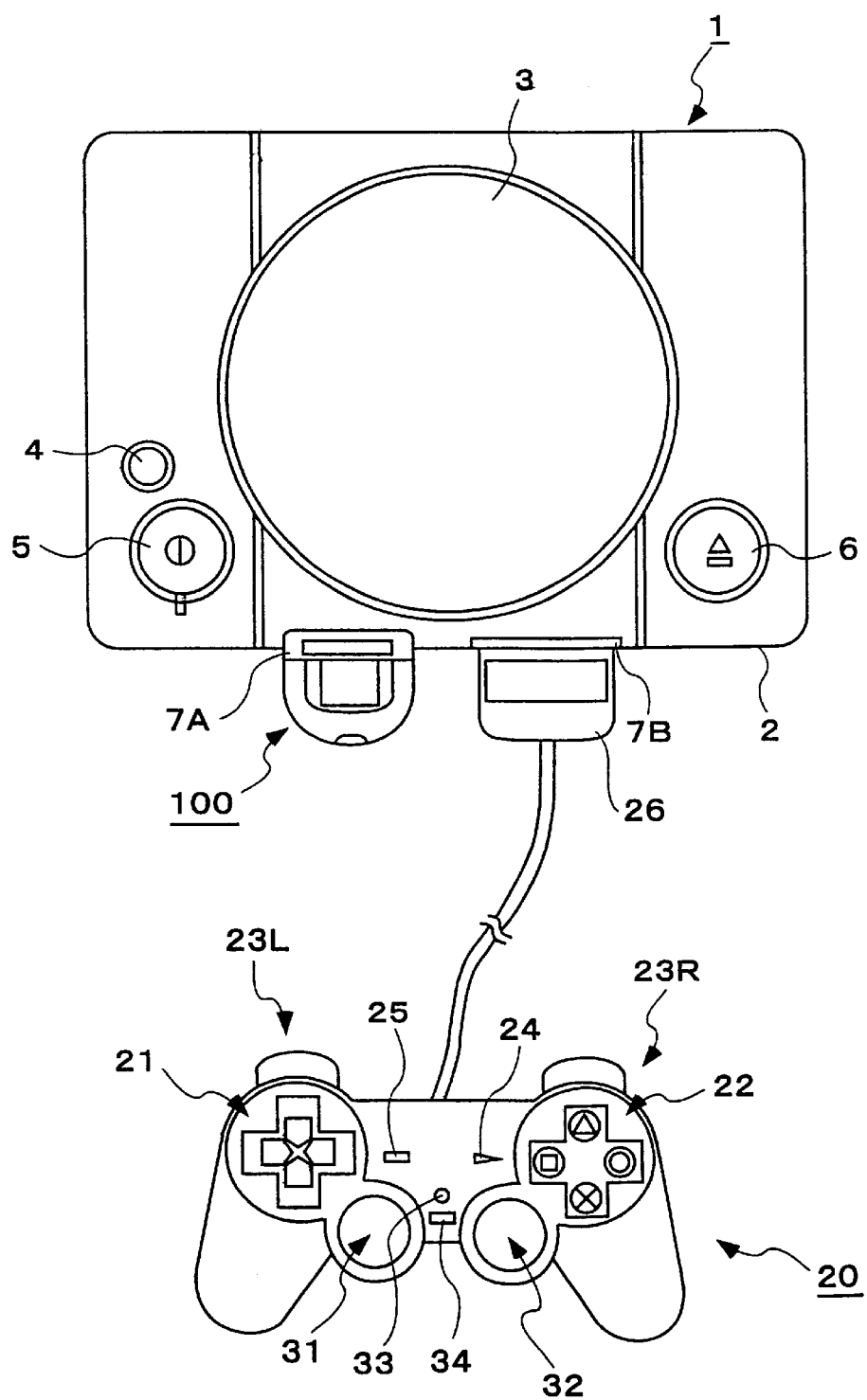
FIG. 1 is a outside drawing of the entertainment unit and the operation unit according to a mode of the present invention.

FIG. 1 shows the outward appearance of an entertainment unit and an operation unit according to the present mode.

This entertainment unit loads a game program from, for example, an optical disc so as to execute that in accordance with directions from the user (the player).

In the following, "the execution of a game" means to move the operation objects displayed on the display screen of the display unit, such as a television connected to this entertainment unit, in accordance mainly with the directions from the player and to control the animated image and the sounds corresponding to that, that is to say, to make the game proceed. Here, the operation objects mean the objects among the objects displayed on the display screen operable by, for example, the operation unit, that is to say, the player characters.

As shown in the figure, the central part of the body 2 of the entertainment unit 1 is provided with a disc mounting part 3 on which an optical disc such as a CD-ROM is mounted. An optical disc, wherein an application program such as a TV game described below is recorded, is mounted on this disc mounting part 3.

In addition, the body 2 of the entertainment unit 1 comprises a reset switch 4 for resetting the game, a power switch 5, a disc operation switch 6 for operating the mounting of an optical disc and two slot parts 7A and 7B.

One operation unit 20 can be connected, respectively, to the two slot parts 7A and 7B. Therefore, a fighting game, or the like, wherein two players utilize separate operation units can be carried out. It is also possible to mount, onto those slot parts 7A and 7B, a portable electronic device 100 which makes it possible to carry out a game under the condition where it is detached from the body 2, a memory card unit 26 which makes it possible to save and load game data, or the like.

The operation unit 20 has the first operation part 21, the second operation part 22, a left button 23L, a right button 23R, a start button 24 and a selection button 25. And the operation unit 20, further, has two analog operation parts 31 and 32 which make analog operation possible, a mode selection switch 33 for selecting an operation mode of those analog operation parts 31 and 32, and a display part 34 for displaying an operation mode selected by the mode selection switch 33.

Figure 2:
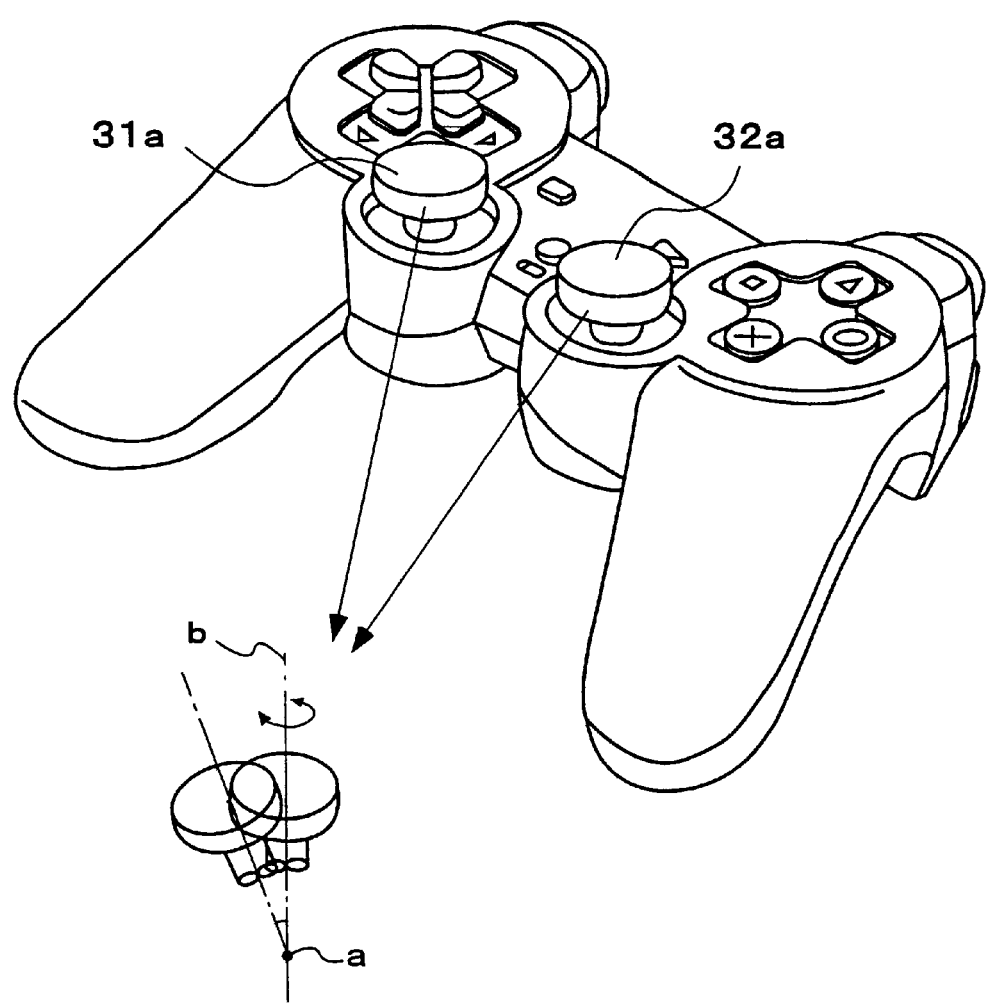
FIG. 2 is a perspective view in a diagonal direction of the operation unit according to a mode of the present invention.

The analog operation parts 31 and 32 have the operation lever 31a and 32a as shown in FIG. 2. Each operation lever 31a, 32a has a predetermined point a as the fulcrum and can be tilted so as to make an angle with a predetermined axis b which passes through this fulcrum a. In addition, each operation lever 31a, 32a can be rotated in both directions around the axis b under the condition that it is tilted so as to make an angle with the axis b. As for the operation units having such an operation lever, an analog joy stick, a game controller having an analog joy stick or the like can be cited.

Figure 3:
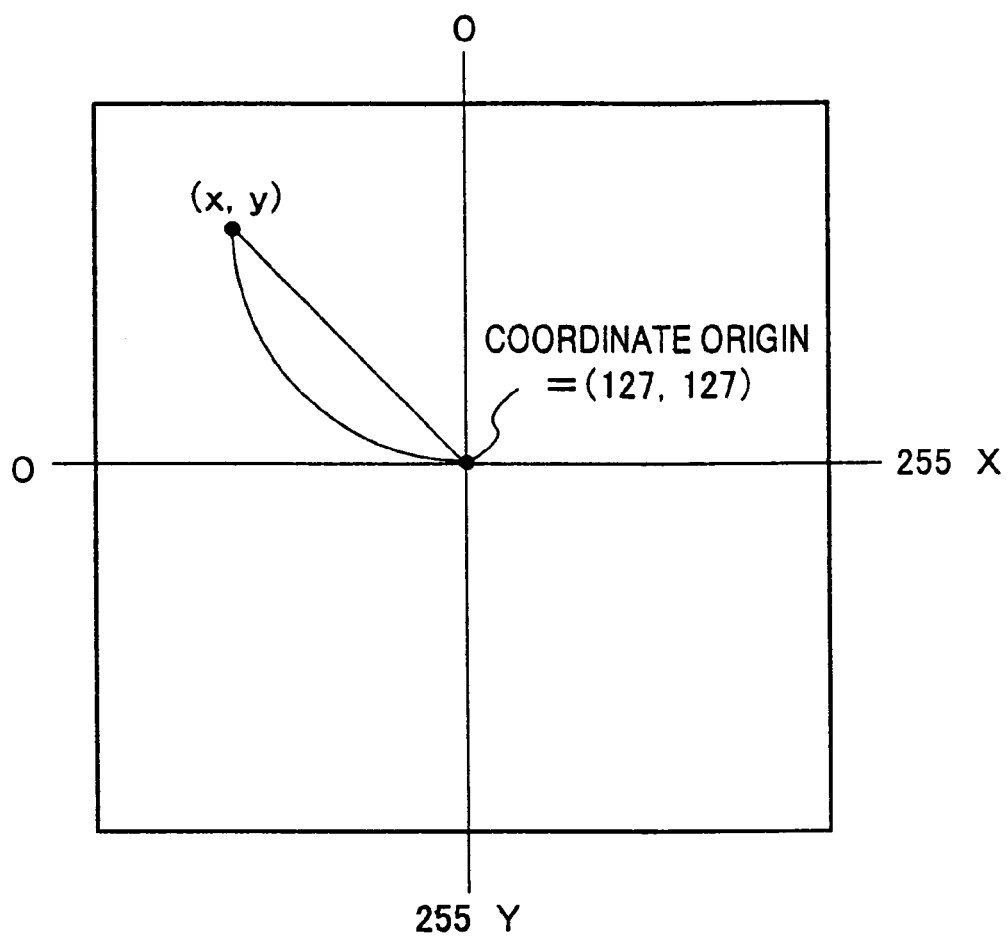
FIG. 3 is a diagram for explaining the data that the operation unit according to a mode of the present invention outputs in accordance with the operation received by the analog operation part.

When the operation levers 31a and 32a tilt so as to make angles with respective axes b, the operation unit 20 outputs a signal in accordance with the coordinate (x, y), determined by the posture (tilt, the direction of tilt) of the operation levers 31a and 32a at that time, on the X—Y orthogonal coordinates system within a plane perpendicular to the axes b. The value y in accordance with the tilt of the operation levers 31a and 32a in the direction of the Y-coordinate axis (in the upper and lower direction in FIG. 3) is given, to the Y element of this coordinate, among the values of 256 levels from "0" to "255" defined on the Y-coordinate axis in the X—Y orthogonal coordinates system as shown in FIG. 3. And the value x in accordance with the tilt of the operation lever 31a and 32a in the direction of the X axis (in the right and left direction in FIG. 3) is given, to the X element of this coordinate, among the values of 256 levels from "0" to "255" defined on the X-coordinate axis in the X—Y orthogonal coordinates system.

In addition, the operation levers 31a and 31b of each of the analog operation parts 31 and 32 comprise the functions of an operation button. Therefore, when the head of each operation lever 31a, 31b is pressed, the operation unit 20 detects this and outputs a signal.

Figure 4:
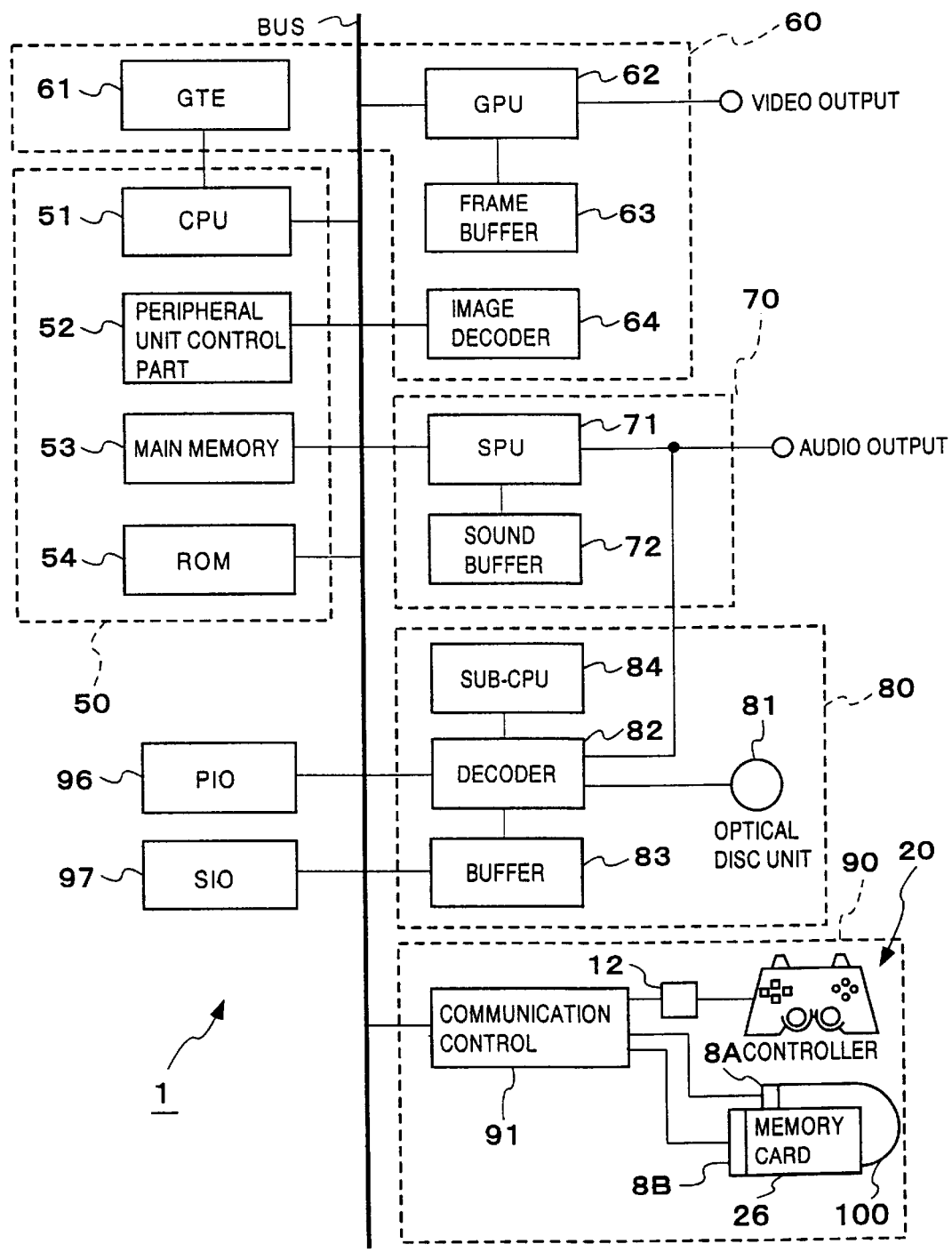
FIG. 4 is a block diagram for explaining a hardware configuration of the entertainment unit according to a mode of the present invention.

FIG. 4 shows a hardware configuration of the entertainment unit 1.

As shown in the figure, this TV entertainment unit 1 comprises a control system 50 including a central processing unit (CPU) 51 and its peripheral unit, a graphic system 60 including a graphic processing unit (GPU) 62 for drawing a graphic in the frame buffer 63, a sound system 70 including a sound processing unit (SPU) 71 for producing an audio signal such as music sound or imitation sound, an optical disc control part 80 for controlling an optical disc 81 wherein an application program is recorded, a communication control part 90 for controlling data transfer from and to a memory card 26, wherein signals from the operation unit 20 into which directions from the user are inputted and the settings of the game are memorized, as well as data transfer from and to a portable electronic device 100 and a bus for connecting respective parts described in the above.

The control system 50 comprises a CPU 51, a peripheral unit control part 52 for carrying out an interrupt control or a control of a direct memory access (DMA) transfer, the main memory 53 including a random access memory (RAM) and a read only memory (ROM) 54 wherein the operating system program for managing the main memory 53, the graphic system 60, the sound system 70 and the like, tis stored.

The CPU 51 controls the entirety of this entertainment unit 1 by executing the operating system loaded from the ROM 54, which includes, for example, a RISC-CPU.

Then, in this entertainment unit 1, when the power is turned on, the CPU 51 of the control system 50 implements the operating system stored in the ROM 54 so that the CPU 51 thereby carries out control of the graphic system 60, the sound system 70 and the like.

And when the operating system is implemented, the CPU 51 controls the optical disc control part 80 after executing the initialization of the entire entertainment unit 1, such as an action confirmation, and then carry out the application program, such as a game program recorded in the optical disc. By executing this program such as a game program, the CPU 51 controls the graphic system 60, the sound system 70 and the like in accordance with the input from the user so as to control the display of images or the production of an imitation sound or music.

In addition, the graphic system 60 comprises a geometry transfer engine (GTE) 61 for processing the coordinate conversion or the like, the GPU 62 for generating graphics in accordance with the graphic generating instructions from the CPU 51, a frame buffer 63 for memorizing the graphics generated by this GPU 62 and the graphic decoder 64 for decoding the graphic data compressed and encoded by the orthogonal transformation, such as a discreet cosine transform.

The GTE 61 comprises a parallel arithmetic unit for performing, for example, a plurality of operations in parallel so as to perform an operation of a matrix or vectors such as a coordinate transformation. More concretely, in case that the application program such as a game program recorded in the optical disc utilizes, for example, what is called 3-D graphics, this GTE 61 generates a virtual three dimensional object with a set of polygons in triangular shape and performs a perspective transformation to project this three dimensional object on a virtual camera-screen, that is to say, rendering whereby the coordinate value of each vertex of each polygon projected on the camera screen are calculated.

The GPU 62 performs a rendering of the three dimensional object for the frame buffer 63 so as to generate a graphic while utilizing the GTE 61, if necessary, according to the command from the CPU 51. Then, a video signal representing the generated graphic is outputted. Here, as for a method for hidden line/hidden surface elimination used in the rendering, the Z buffer method, the scan line method, the ray tracing method or the like are utilized and as for a method of shading, the flat shading, the grow shading and the ray tracing methods are utilized. And, as for a method for expressing the surface material or patterns of the surfaces of the three dimensional object, texture mapping, or the like, are utilized.

The frame buffer 63 comprises a what is called dual port RAM so as to be able to carry out the rendering of the GPU 62, or the transfer from the main memory, and the data loading for the display at the same time. And this frame buffer 63 includes a texture area to store the texture used for the above described texture mapping, or the like, in addition to a graphic area to read data for the rendering and the display The graphic decoder 64 decodes graphic data of static images or dynamic images stored in the main memory 53 and stores them in the main memory 53 by control of the CPU 51. And this regenerative piece of graphic data can be utilized as a background image of the image rendered by the above described GPU 62 by being stored in the frame buffer 63 via the GPU 62.

The sound system 70 comprises an SPU 71 for outputting audio signals such as music and imitation sound by the instructions from the CPU 51 and a sound buffer 72 wherein wave form data or the like are recorded by this SPU 71.

The SPU 71 comprises an ADPCM decoding function for reproducing the sound data encoded through adaptive differential PCM (ADPCM), a reproduction function for reproducing and outputting audio signals, such as imitation sound, by reproducing the wave form data stored in the sound buffer 72 and a modulation function, for modulating and reproducing the wave form data stored in the sound buffer 72. By comprising those functions, this sound system 70 can be employed as what is called sampling sound source which produces audio signals such as music and imitation sound based on the wave form data stored in the sound buffer 72 by the instruction from the CPU 51.

The optical disc control part 80 comprises an optical disc unit 81 for regenerating the program or the data recorded in an optical disc, a decoder 82 for decoding the program or the data recorded in addition to, for example, the error correction code (ECC) and a buffer 83 for making the data read rate from the optical disc higher by temporarily storing the data from the optical disc unit 81. A sub-CPU 84 is connected to the decoder 82.

As for the sound data to read out in the optical disc unit 81, which are recorded in the optical disc, what is called PCM data which are analog/digital converted from an audio signal exist in addition to the above described ADPCM data. The ADPCM data are supplied to the above described SPU 71 after being decoded by the decoder 82 and are outputted as music, imitation sound or the like from an acoustic unit such as an audio apparatus connected to this TV game unit 1 after a process such as a digital/analog conversion is applied in the SPU 71. And the PCM data are outputted as music, sound effects or the like from an acoustic device in the same way after a process such as digital/analog conversion is applied in the SPU 71.

The communication control part 90 comprises a communication controller 91 for controlling communication with the CPU 51 via the bus BUS. The communication controller 91 is provided with an operation unit connection part 12 to which the operation unit 20, for inputting the instruction from the user, is connected and memory card insertion parts 8A and 8B, to which a memory card 26, as an auxiliary memory unit for storing the game setting data or the like, and a portable electronic device 100 are connected.

The operation unit 20 which is connected to the operation unit connection part 12 transmits the conditions of the above described respective buttons or control parts to the communication controller 91 through synchronized communication in accordance with the instructions from the communication controller 91 in order to input the instructions from the player. Then the communication controller 91 transmits the state of the above described respective buttons and the operation parts of the operation unit 20 to the CPU 51.

Thereby, the instructions from the player are inputted into the CPU 51 and the CPU 51 executes a process, based on the game program or the like which are being executed, in accordance with the instructions from the player More concretely, the images including the player character are produced through the combination with other respective parts of the control system 70 and the graphic system 60 so as to be displayed on the display screen of the display unit. Then, by following the instructions from the player inputted into the operation unit 20, the images with the play character changed in display position or posture (with the background being changed if necessary) are sequentially produced and displayed on the display screen of the display unit. Accordingly, the images are animated as if the player character acts in accordance with the contents of the operation which the player inputted into the operation unit 20. In addition, sounds or music to be outputted from the sound unit are controlled in combination with the sound system 70 if necessary.

Here, it is necessary for the image data to be transferred at a high speed among the main memory 53, the GPU 62, the image decoder 64 and the decoder 82 when the program is loaded or the images are displayed or the graphics are generated. Therefore, DMA transfer, whereby data can be transferred directly among the main memory 53, the GPU 62, the image decoder 64 and the decoder 82 by control from the peripheral unit control part 52 without passing through the CPU 51, as described in the above, can be performed in this entertainment unit. Thereby, the CPU load by data transfer can be reduced so that data transfer can be carried out at high speed.

And the CPU 51 transmits the data such as the setting data of the executing game to the communication controller 91 when it is necessary to store it and the communication controller 91 writes the data received from the CPU 51 in the memory card 26 or the portable electronic device 100 which are mounted in the slots of the memory card insertion parts 8A or 8B.

Here, a protection circuit for providing protection against electrical breakdown is built-in in the communication controller 91. The memory card 26 or the portable electronic device 100 is separated from the bus BUS and can be attached or detached under the condition where the power is supplied to the unit body. Therefore, a new memory card or the like can be inserted to be attached without cutting off the power supply of the unit body in the case that the memory capacity of the memory card 26 or the portable electronic device 100 is running short. Therefore, it is possible to mount a new memory card so that necessary data can be written into the new memory card without losing the game data of which it is necessary to create back up copy.

Here, the interfaces for connecting other apparatuses to the entertainment unit body are denoted as 96 and 97, more concretely, they are a parallel I/O interface (PIO) 96 and a serial I/O interface (SIO) 97.

The hardware configuration of the entertainment unit 1 is described in the above.

A process executed in the entertainment unit 1 wherein an application program is loaded from the optical disc mounted on the disc mounting part 3 and a game is executed according to the program is described in the following.

First, a summary of the TV game according to the first mode of the present invention is described.

In the present TV game, a score of an evaluation value for the operation object (player character) is gotten through the operation of the operation unit by the player. The "evaluation value for the operation object" described herein means a value set for the player character in accordance with the contents of the game during the progress of the game. As for concrete examples of such an evaluation value, the level of the strength recovery of the player character, the extent of the influence of the attack upon the opponent by the player character or the like are cited.

Figure 5A:
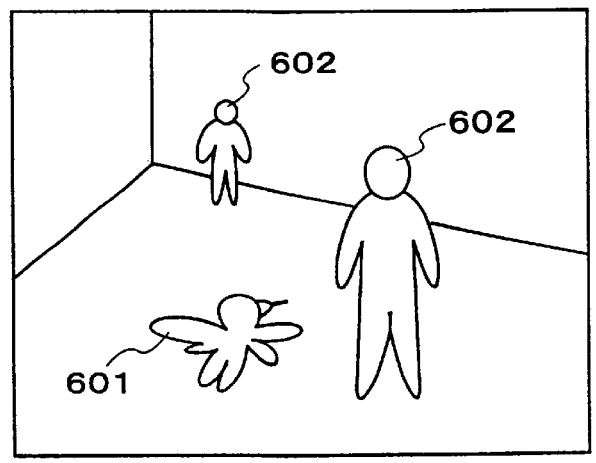
FIGS. 5A to 5C are a view for explaining the contents of the game according to a mode of the present invention which is performed in the entertainment unit of FIG. 1.
Figure 5B:
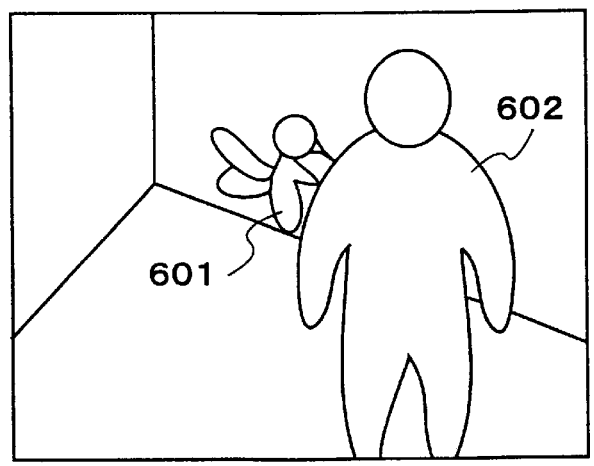
Figure 5C:
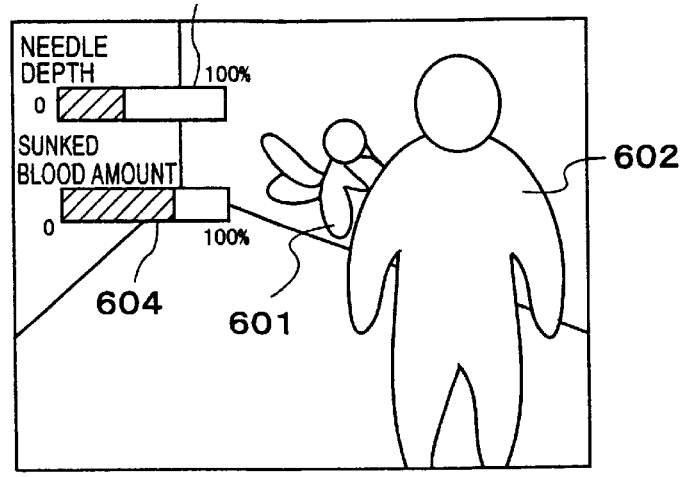

The present TV game is implemented, for example, as a game which makes the operation object (player character) 601 a mosquito suck blood from the displayed object (non-player character) 602 representing a person as shown in FIG. 5. More concretely, the game is implemented as follows: by operating the analog operation parts 31 and 32 of the operation unit 20 the player moves the player character 601 on the display screen (see FIG. 5a) so as to make the player character 601 sit on the non-player character 602 (see FIG. 5b) and then to make the player character 601 suck blood without having the non-player character 602 become aware of it and, thereby, the evaluation values 603 and 604 are gotten which indicate the strength available for existence of the player character 601 in the game (see FIG. 5C). Here the evaluation value of the player character 601 is reduced as time passes or whenever the player character 601 takes a predetermined action. It is necessary for the player to make the player character 601 suck blood before this evaluation value is cleared to zero.

Next, the description is made for the process the entertainment unit 1 performes by executing the application program for implementing this TV game.

Figure 6:
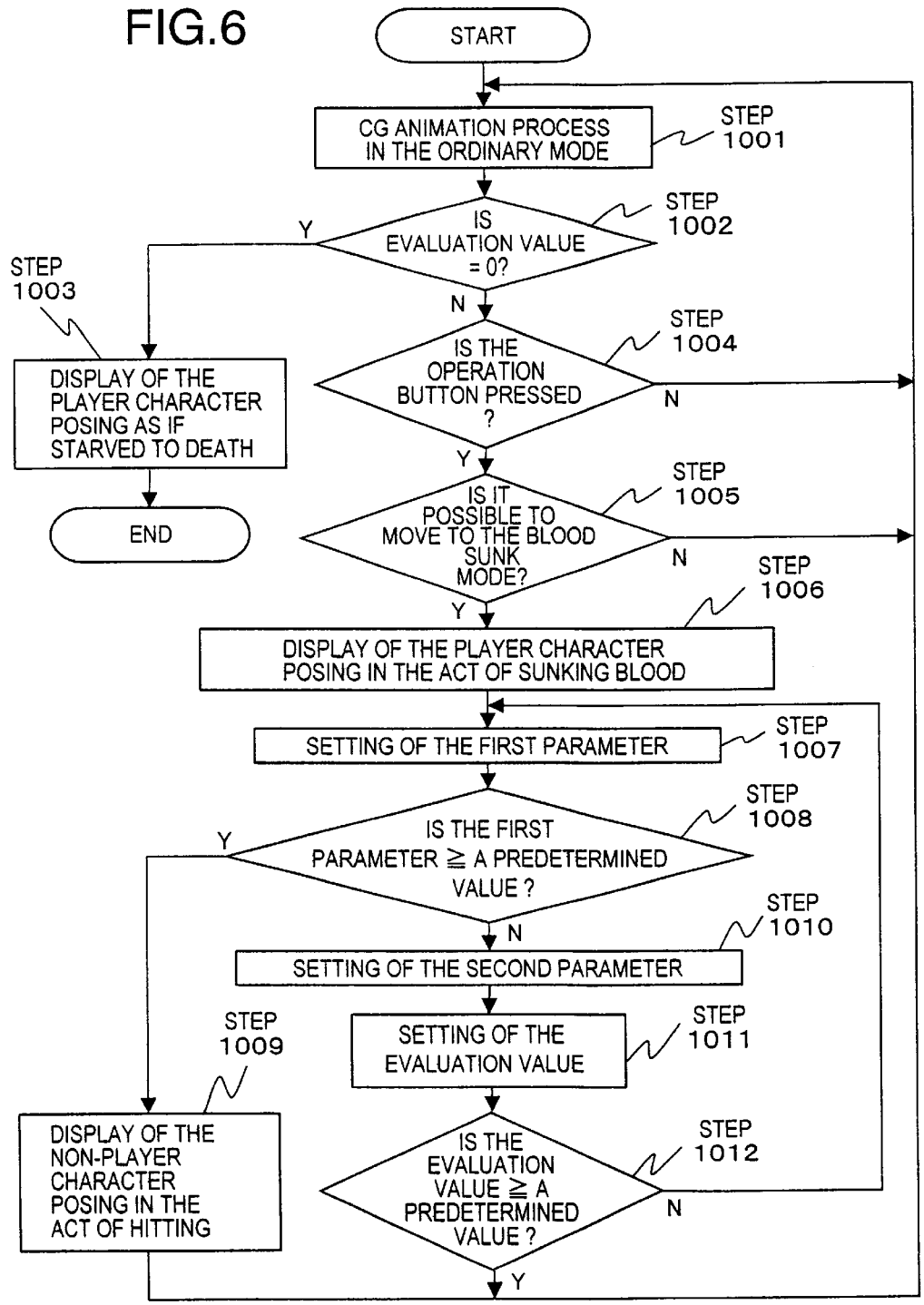
FIG. 6 is a flowchart showing a process carried out in the entertainment unit of FIG. 1 while the game according to a mode of the present invention is performed.

FIG. 6 is a flow chart showing a process performed by the entertainment unit 1 which executes the application program loaded from the optical disk mounted in the disk mounting part 3.

First, the CPU 51 starts a CG animation generating process of a ordinary mode (Step 1001) in combination with each part shown in FIG. 4 when the game starts according to the present application program. The CG animation generaing process of a ordinary mode which is started here is a process as follows.

The CPU 51 arranges a three dimensional model of the non-player character 602 and a three dimensional model of the player character 601 in the world coordinate space wherein a background model representing, for example, the inside of a house is arranged in accordance with the application program and with a variety of data read from the optical disk mounted in the disk mounting part 3.

Here, the location of the three dimensional model of the player character 601 in the world coordinate space is determined according to the contents of the operation received from the player by the operation unit 20. For example, in the case that the above described coordinate (x, y), which is dependent on the posture of the operation levers 31a and 31b of the analog operation parts 31 and 32, is sent from the operation unit 20 via the communication controller 91, the CPU 51 moves the three dimensional model of the player character 601 in the world coordinate space from the present location to the direction within the XY coordinate plane according to that coordinate (x, y). And in the case, for example, that a detection signal of either operation button of the operation parts 21 or 22 is sent, the player character 601 in the world coordinate space is moved from the present location in the direction of the Z-coordinate axis in accordance with that detection signal.

On the other hand, the location of the three dimensional model of the non-player character 602 in the world coordinate space changes continuously according to the attribute associated with the non-player character 602 in the application program or the variety of data as if the non-player character 602 is moving around in the world coordinate space.

Then the CPU 51 makes the GPU 62 periodically render the background model and each of the three dimensional models in the world coordinate space from the station point which is dependent on the location of the player character 601 in the world coordinate space. Thereby, a rendered image as shown in FIG. 5a is generated.

In this way by making the GPU 62 periodically generate a rendered image, the CPU 51 generating an animation including image of the player character 601 which moves according to the contents of the operation received from the player by the operation unit 20.

Here, this type of CG animation generating process is a prior art used in an entertainment unit wherein a player character is operated by using a game controller.

Now, while performing the CG animation generating process of a ordinary mode the CPU 51 reduces the evaluation value of the player character 601 set in Step 1010 described in the following as time passes or whenever the player character 601 takes a predetermined action. When the evaluation value is cleared to zero (Step 1002) the CPU 51 assumes the player character 601 has starved to death and arranges a three dimensional model of the player character 601, which is posing, for example, as if fallen down on the ground in the world coordinate space according to the application program and to a variety of data read from the optical disk mounted in the disk mounting part 3. Then CPU 51 makes the GPU 62 render respective models in the world coordinate space so as to map the rendered images on the display screen (Step 1003). Afterwards, the CPU 51 completes the process to end the game.

And, while performing the CG animation generating process of an ordinary mode, the player makes the player character 601 come close to the non-player character 602 through the operation of the operation unit 20 and then presses a predetermined operation button (for example the head of the operation lever 31, 32 of the analog operation part 31, 32 or the like) of the operation unit 20. The CPU 51 detects it (Step 1004) by a signal sent from the operation unit 20 via the communication controller 91 and then perform the following process.

The CPU 51 checks the gap between the location of the three dimensional model of the player character 601 and the location of the three dimensional model of the non-player character 602 in the world coordinate space. In the case that the gap is a threshold value or less it, CPU 51 initiates the CG animation generating process of the blood suck mode (Step 1005) after relating the non-player character 602 to the player character 601. The CG animation generating process of the blood suck mode which is initiated here is the process as follows.

The CPU 51 first arranges the three dimensional model of the player character 601 posing in the act of blood suck on the three dimensional model of the non-player character 602, which has been related to the player character 601, in the world coordinate space according to the application program and to a variety of data read from the optical disk mounted in the disk mounting part 3. Then, by making the GPU 62 periodically render each of the models in the world coordinate space, a rendered image as shown in FIG. 5b is formed (Step 1006).

Next, the CPU 51 calculates the tilt angle of the operation levers 31a and 31b made with the respective axes b on the basis of the above described coordinate (x, y) sent from the operation unit 20 via the communication controller 91, which is determined in accordance with the posture of the operation axes 31a and 31b of the analog operation parts 31 and 32. As for the method for calculating the tilt angles used herein the following two methods, for example, exist.

The coordinate (x, y) sent from the operation unit 20 is a coordinate of the projected image of the point on the sphere with the coordinate origin in FIG. 3 as its center. Accordingly, in the case that the length of the radius of the sphere is predetermined the tilt angles of the operation levers 31a and 32a made with the axes b can be calculated from the length of the radius and the coordinate (x, y) sent from the operation unit 20 by utilizing the trigonometric functions.

In FIG. 3, the distance between the location shown by the coordinate (x, y) sent from the operation unit 20 and the coordinate origin is made to correspond to the tilt angles of the operation levers 31a and 32a made with the axes b in a one-to-one relationship. Accordingly, in the case that a corresponding relationship between the gap between each point on the two dimensional plane and the coordinate origin in FIG. 3 and tilt angles of the operation levers 31a and 32a made with the axes b is clarified in advance, the tilt angles of the operation levers 31a and 32a made with the axes b can be found based on the distance by calculating the distance between the location shown by the coordinate (x, Y) sent from the operation unit 20 and the coordinate origin.

The CPU 51 calculates the tilt angles of the operation levers 31a and 32a made with the axes b, and then sets the value in accordance with the tilt angles as the first parameter (Step 1007). This first parameter is displayed on the display screen as a score representing the depth of the needle inserted into the non-player character 602 by the player character's act of blood sucking, that is to say as a score representing the displeasure of the non-player character 602. In this way, as for the method for displaying the first parameter on the display screen there is, for example, a method of displaying an indication object exhibiting the set value of the first parameter overlapping on the rendered image. According to the present mode, a bar 603 of which the length varies in accordance with the set value of the first parameter is displayed overlapping on the rendered image as an indication object as shown in FIG. 5c.

Next, the CPU 51 checks whether or not the first parameter set at Step 1007 has reached a threshold value (Step 1008). Here, the player can be informed whether or not the set value of the first parameter reaches a threshold value by a bar 603 indicating the first parameter as shown in FIG. 5C.

In the case that the first parameter reaches a threshold value, the CPU 51 assumes that the non-player character 602 becomes aware of the act of blood sucking by the player character 601 and reduces the described-below evaluation value of the player character 601 by a predetermined amount of the value. Then the CPU 51 arranges, for example, a three dimensional model of the non-player character 602 which takes the pose of hitting the player character 601 and a three dimensional model of the player character 601 which takes the pose of being hit by the non-player character 602 in the world coordinate space according to the application program and a variety of data read from the optical disk mounted in the disk mounting part 3. Furthermore, the CPU 51 makes the GPU 62 render each of the models in the world coordinate space so that the rendered image is thereby formed (Step 1009). Afterwards the CPU 51 dissolves the relationships between the player character 601 and the non-player character 602 and then resumes the CG animation generating process of an ordinary mode (Step 1001).

On the other hand, in the case that the first parameter has not reached a threshold value, the CPU 51 detects the angle of rotation by the rotation operation given to the operation levers 31a and 32a of the analog operation part 31 and 32 before a predetermined time has passed since the first parameter is set, and then the CPU 51 sets a value in accordance with that angle is set as the second parameter (Step 1010). Here, the angle of rotation detected herein may be the one by either rotation operation to the right or the left direction given to the operation levers 31a and 32a.

Figure 7:
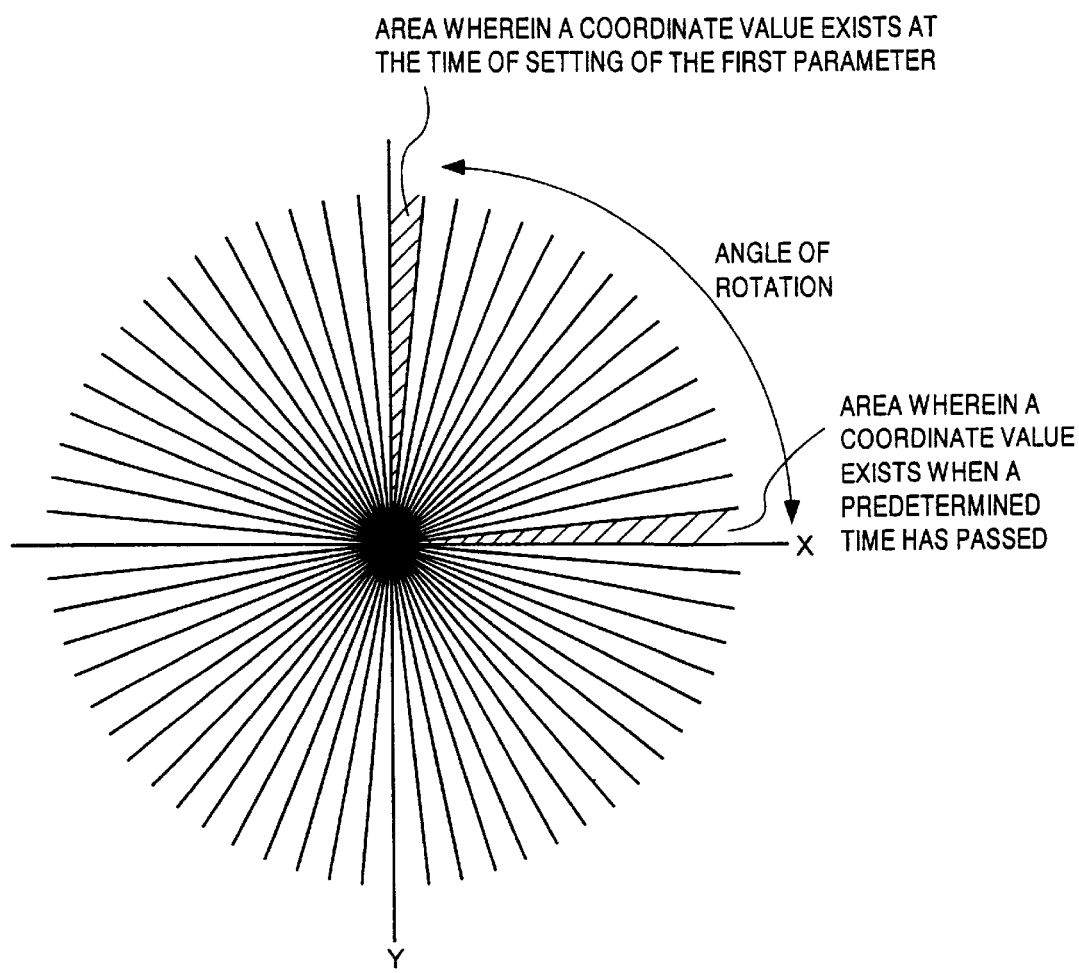
FIG. 7 is a diagram for explaining the detection principle of the angle of rotation of the operation lever provided in the analog operation part of the operation unit according to a mode of the present invention.

More concretely, the XY coordinate system of FIG. 3 is, for example, radially divided into 64 areas with the coordinate origin as its center as shown in FIG. 7. The angle, by which the operation levers of the analog operation part are rotated around the axes b to right or the left until a predetermined time has passed since the first parameter is set, is calculated based on an area including the coordinate (x, y) used to set a value for the first parameter in the Step 1007, an area including the coordinate (x, y) sent from the operation unit 20 via the communication controller 91 at time when the predetermined time passed since then and sum of the number of areas passed through so far.

After setting a value for the second parameter the CPU 51 sets, as the above described evaluation value of the player character 601, the product of the set point of the second parameter by a coefficient in accordance with a value set for the first parameter in Step 1007. In the case that an evaluation value is already set, the newly calculated product is added to the evaluation value, and the result is set as a new evaluation value of the player character 601 (Step 1011). This evaluation value is displayed on the display screen as an amount of sucked blood from the non-player character 602 by the player character's act of blood sucking In this way, in order to display an evaluation value on the display screen, an indication object exhibiting this evaluation value may, for example, be desplayed so as to by overlapped on the rendered image. In the present mode, as shown in FIG. 5c a bar 604 of which the length varies in accordance with the evaluation value is displayed so as to be overlapped on the rendered image as the indication object.

In addition, this evaluation value is reduced as time passes or whenever the player character 601 takes a predetermined action as described above and, therefore, the player has to make the player character 601 perform the act of blood sucking before this evaluation value is cleared to zero.

Next, the CPU 51 checks whether or not the evaluation value set at Step 1011 has reached a threshold value (Step 1012). In the case that the evaluation value has reached a threshold value, the CPU 51 assumes that the act of blood sucking is completed and dissolves the relationships between the player character 601 and the non-player character 602, and then resumes the CG animation generating process of an ordinary mode (Step 1001). On the other hand, in the case that the evaluation value has not reached a threshold value, the CPU 51 returns the process to Step 1007 and continues the CG animation generating process of the blood sucking mode. Here, the player can be informed whether or not the evaluation value has reached a threshold value by a display bar 604 as shown in FIG. 5c.

According to the present mode, the first parameter is set exhibiting the depth of the needle inserted in the non-player character 602 by the player character's act of blood sucking on the basis of the tilt angles of the operation levers 31a and 32a by the act of the player who tilts the operation levers 31a and 32a of the operation unit 20, and the second parameter is set based on the angles of rotation of the operation levers 31aand 32a by the act of the user who rotates the operation levers 31a and 32a of the operation unit 20 to the right or the left. And then, based on the set values of the first and the second parameters, an evaluation value of the player character 601 is set which indicates the amount of sucked blood from the non-player character 602 by the player character 601.

In this way, according to the present mode, in the case that the operation unit 20, such as an analog joy stick, is used as an input unit of an entertainment unit the operation of its operation levers 31a and 32a can be utilized not only for moving the player character 601 but for setting an evaluation value of the player character 601. In this way, in the case that the operation of the operation levers 31a and 32a can be utilized for setting the evaluation value of the player character 601, it becomes possible to increase the extent of the entertainment value compared to the case where the evaluation value of the player character is determined based merely on the number of hits in a row of the operation buttons.

In addition, according to the present mode, the operation of the operation levers 31a and 32a can be utilized for both setting the evaluation value of the player character 601 and for moving the player character 601. That is to say, the player can carry out the operations in sequence for the player character 601 by using the operation levers 31a and 32a and, therefore, it becomes possible to operate the player character 601 more smoothly.

And, in the present mode, in the case that the set value of the first parameter which exhibits the depth of the needle inserted in the non-player character 602 by the act of blood sucking of the player character 601 exceeds a threshold value, the evaluation value of the player character 601 is reduced by a predetermined amount of value. It is generally considered that the larger the tilt angle of the operation lever is, the lower the extent of difficulty of the act of rotating the operation lever at a tilt is. That is to say, the more the operation lever is tilted, the quicker the operation lever can be rotated so that it becomes possible to gain a larger evaluation value (the amount of blood sucked from the non-player character 602) in a shorter time. The larger the operation lever is tilted, however, the larger the first parameter becomes accordingly. Then, in the case this first parameter exceeds a threshold amount the game is over. Therefore, a skillful operation of the operation lever is required in order to make the evaluation value of the player character 601 larger quickly enough so as not to make the first parameter exceed a threshold value. In this way, according to the present mode, it becomes possible to increase the extent of entertainment value compared to the case where the evaluation value of the player character is determined merely by the number of hits in a row of the operation buttons.

Though the above description is made for the display screen of the display unit wherein 3D CG animations are displayed, it is of course possible to apply the present invention to displaying 2D CG animations.

Though in the above the second parameter is set based on the angle of rotation of the operation lever within a predetermined time, it is possible to set the second parameter based on the rotation speed of the operation lever within a predetermined time. It is also not necessary to limit the detection intervals of the angle of rotation or the like of the operation lever to a predetermined time but, the detection intervals of the angle of rotation or the number of rotations of the operation lever may be varied under a proper condition.

In the above described mode, the description is made for the case which uses, as a game program executed in the present entertainment unit 1, a program wherein a game is played such that, as shown in FIG. 5, the player moves the player character 601 representing a mosquito to sit on the non-player character 602 representing a person and makes the player character 601 perform the act of sucking blood without having the non-player character 602 become aware of it so that the player character 601 can gain an evaluation value exhibiting the strength or the like necessary for existing in the game.

However, the present invention is not limited to this example. For example, the present invention can be applied to the case wherein the above described entertainment unit 1 perform what is called racing game driving a passenger car on the display screen of the display unit. An application example of a racing game is described as the second mode of the invention in the following.

Figure 8:
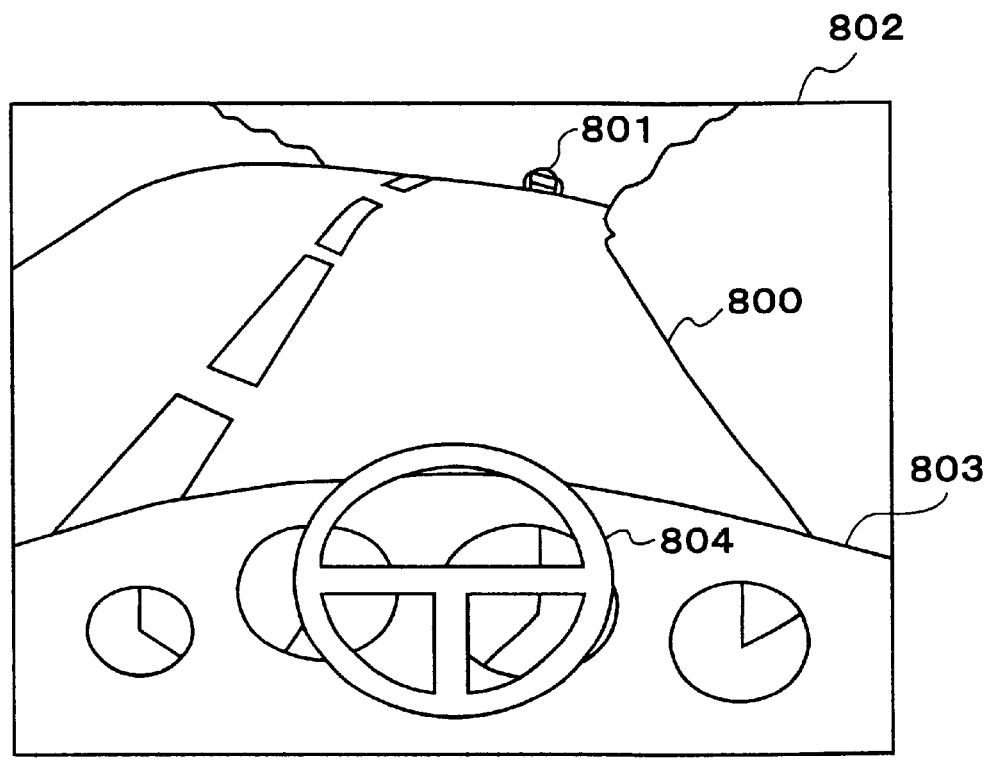
FIG. 8 is a view for explaining the contents of the game according to another mode of the present invention which is performed in the entertainment unit of FIG. 1.

The racing game here provides on the display screen 802, for example, as shown in FIG. 8, a virtual driving environment which makes the player feel like he is seeing the lane 800 and another passenger car 801 or the like through the windshield of the passenger car 803 which is the operation object (player character) so that the passenger car 803 attempts to complete the race course without fail by synchronizing the running condition of the passenger car 803 the operation of the operation unit by the player.

Here, the operations received by one of the operation lever 32a of the operation unit after the racing game is started are regarded as the steering operations of the passenger car 803 which is a player character. That is to say, the operations received by one of the operation lever 32a of the operation unit are made to correspond to the steering operations of the passenger car 803 which is a player character in a 1 to 1 relationship. More concretely, it works as follows.

Figure 9:
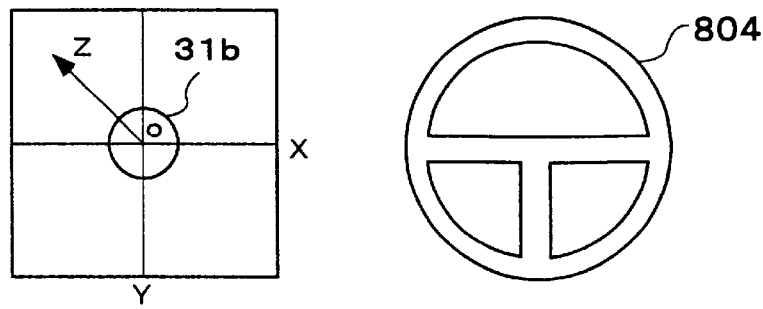
FIG. 9 is a diagram for explaining an operation method of the operation lever in the game according to another mode of the present invention.

As shown in FIG. 9, in the case that the operation lever 32a receives non-operations such as the case, for example, where the player released his hand from the operation lever 32a (the position of the operation lever at this time is called the standard position), the steering wheel 804 of the passenger car 803 which is a player character is located in the initial position. Then, the passenger car 803 which is a player character runs straight along the lane 800. The condition of the operation lever 32a of the operation unit is called neutral.

Figure 10:
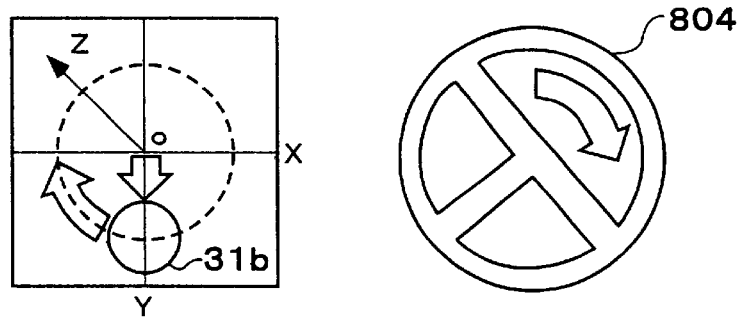
FIG. 10 is a diagram for explaining an operation method of the operation lever in the entertainment according to another mode of the present invention.
Figure 11:
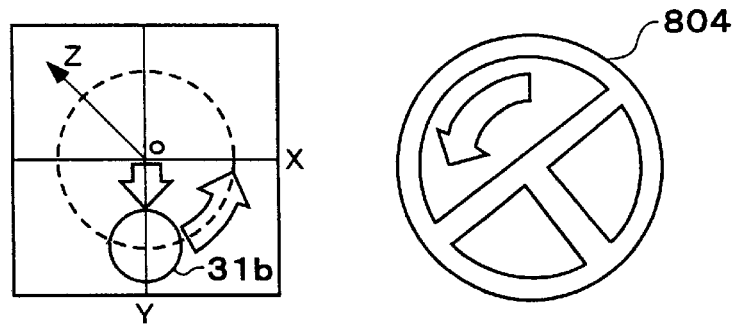
FIG. 11 is a diagram for explaining an operation method of the operation lever in the entertainment according to another mode of the present invention.
Figure 12:
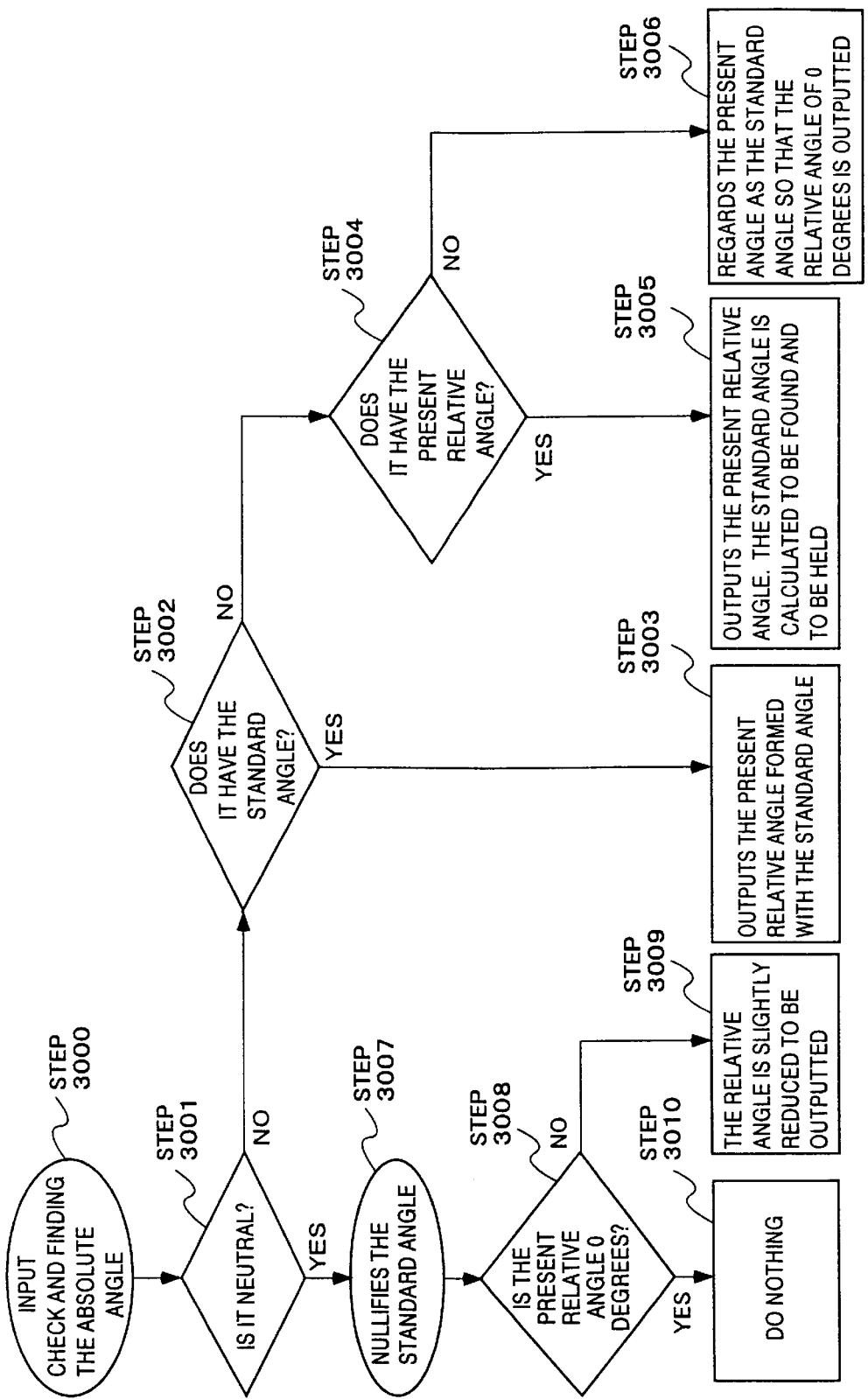
FIG. 12 is a flowchart showing a process which is carried out in the entertainment unit of FIG. 1 while the game according to another mode of the present invention is performed.

In the case that the player pushes the operation lever 32a in any direction to tilt it corresponds to the case wherein the steering wheel 804 of the passenger car 803 which is a player character is gripped. If the player holds the operation lever 32a without rotating thereof the passenger car 803 which is a player character keeps running straight along the lane 800 since this is the condition where the steering wheel 804 of the passenger car 803 is merely gripped and, as shown in FIGS. 10 and 11. In the case that the player rotates the operation axis 32*a* in either direction to the right or to the left while pushing it to tilt in any direction, the passenger car 803 which is a player character has its steering wheel 804 turned to the direction of rotation and makes a curve on the lane 800 in the direction corresponding to this steering wheel control. That is to say, when the operation axis 32*a*, which has been pushed to become tilted, rotates to the right (clockwise) around a predetermined axis Z (hereinafter referred to as the standard axis Z) which passes through the fulcrum 0 of the operation lever 32*a*, the steering wheel 804 on the display screen is turned to the right (see FIG. 10) so that the passenger car 803 curves to the right and, contrarily, when the operation lever 32*a* which has been pushed to become tilted rotates to the left (counterclockwise) around the standard axis Z, the steering wheel 804 on the display screen is turned to the left (see FIG. 11) so that the passenger car 803 curves to the left. As for such an operation of the operation lever 32*a*, the timing of the operation of pushing to become tilted corresponds to the timing of the changing of the grip of the steering wheel immediately before the starting of the actual steering wheel rotation and, moreover, the rotation operation feels similar to the actual steering wheel rotation operation and, therefore, it is possible to provide the player with a more realistic steering feeling while the game is being played. For example, the player can make the passenger car 803 on the display screen make a sharp curve with an operation feeling or can finely adjust the direction of running of the passenger car 803 on the display screen as if the actual passenger car is being steered. The description is made in reference to FIG. 12 for the process as follows: in this way, the operations received by the operation lever of the operation unit 20 are made to correspond to the steering wheel operations of the passenger car 803 on one-to-one basis.

When the CPU 51 receives an input signal from the operation unit 20 an angle (hereinafter referred to an absolute angle) made between the projected image of the operation lever 32*a* onto the XY plane and the X axis is calculated from the XY coordinate value included in this input signal (Step 3000).

After that the CPU 51 determines whether or not the operation lever of the operation unit 20 is in neutral in accordance with the XY coordinate value included in the input signal (Step 3001).

In the case that the operation lever of the operation unit 20 is not in neutral, it is determined whether or not the operation lever 32*a* of the operation unit 20 holds the standard angle representing the starting point of rotation at present (Step 3002).

Then, in the case that the standard angle is held at present, a relative angle of the absolute angle to this standard angle is calculated. Then, this relative angle is outputted as the relative angle of rotation (hereinafter referred to as a steering wheel relative angle of rotation) of the steering wheel of the player character 803 (Step 3003).

On the other hand, in the case that the standard angle is not held at present, it is determined whether or not the steering wheel relative angle of rotation is held at present (Step 3004). Then, in the case the steering wheel relative rotation angle is held at present, this steering wheel relative rotation angle is outputted and the standard angle is inversely calculated from this steering wheel relative rotation angle so as to hold this standard angle (Step 3005). And, in the case that the steering wheel relative rotation angle is not held at present, the absolute angle which is held at present is held as the standard angle and 0 degrees is outputted as the steering wheel relative rotation angle (Step 3006).

In addition, in Step 3001, in the case the operation lever of the operation unit 20 is in neutral, the standard angle is nullified (Step 3007). After that, it is determined whether or not the steering wheel relative rotation angle is 0 degrees (Step 3008).

Then, in the case the steering wheel relative rotation angle has a value other than 0 degrees the steering wheel relative angle is decremented by a predetermined angle (Step 3009). Since this process is carried out immediately after the player puts the operation lever in neutral, the steering wheel 804 of the passenger car 803 which is a player character starts moving back to the initial position.

In the case that the steering wheel relative rotation angle is 0 degrees no process is carried out (Step 3010).

During the process described above, the steering wheel relative rotation angles outputted in Step 3009, 3003 and Step 3005 are used for changing the orientation of the player character 803 arranged in the world coordinate space.

Figure 13:
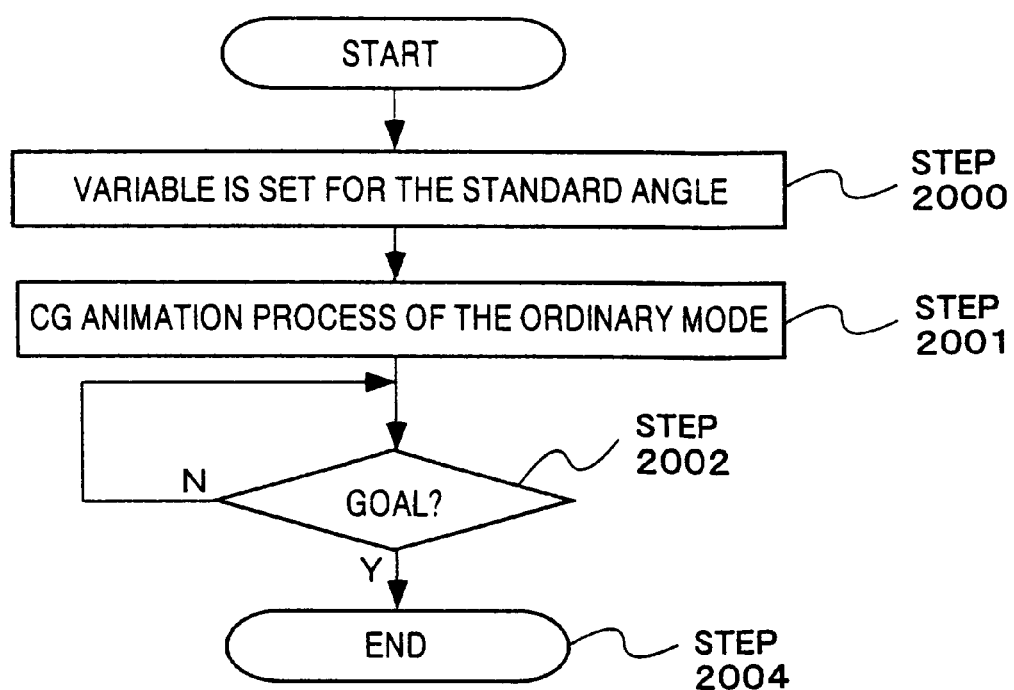
FIG. 13 is a flowchart showing a process which is carried out in the entertainment unit of FIG. 1 while the game according to another mode of the present invention is performed.
Figure 14:
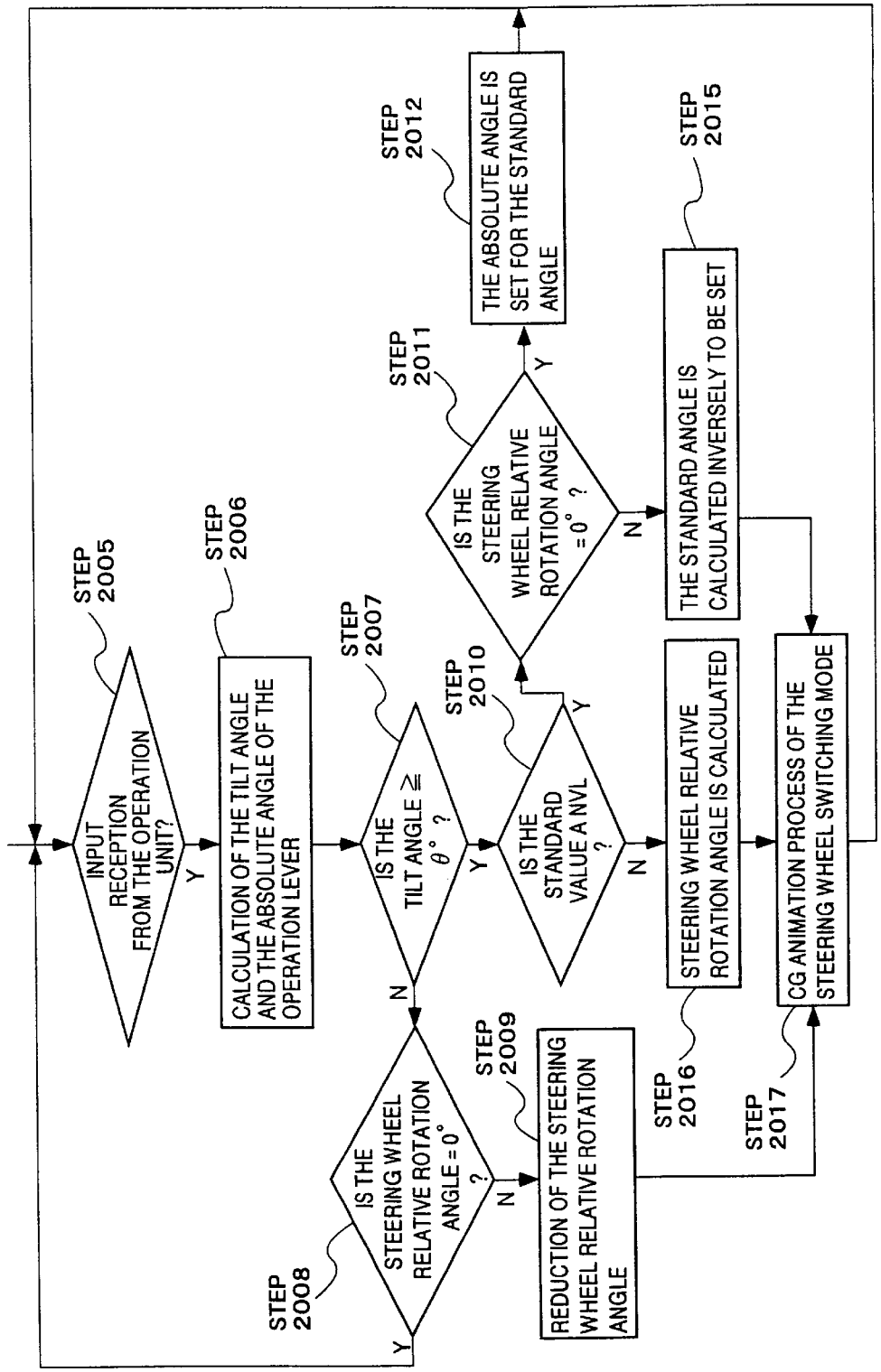
FIG. 14 is a flowchart showing a process which is carried out in the entertainment unit of FIG. 1 while the game according to another mode of the present invention is performed.

Next, a more concrete description is made for the entire process with respect to the racing game including the operations of the player who is playing the game in reference to FIGS. 13 and 14.

The above described entertainment unit 1 loads an application program from the optical disk mounted in the disk mounting part 3 into the main memory 53 so as to perform the following process by implementing this program.

The CPU 51 loads an application program and a variety of data from the optical disk mounted in the disk mounting part 3, and then initiate the following racing game process defined in this application program.

First, the CPU 51 sets a null character for the standard angle variable representing the starting point of rotation of the operation lever 32*a* of the operation unit 20 and sets 0 degrees as the steering wheel relative rotation angle variable representing a relative steering wheel rotation angle of the passenger car 803 which is a player character. Then the graphic system 60 is controlled so as to display an opening screen on the display screen (Step 2000).

When a detection signal of the start button 24 is outputted from the operation unit 20 the CPU 51 detects it and makes the graphic system 60 initiate the 3D CG animation generating process of an ordinary running mode (Step 2001). More concretely, three dimensional models of the passenger car 803 which is a player character, another passenger car 801 which is a non-player character and the like are arranged in the world coordinate space wherein a background model such as a race course is arranged and the images formed in the above are animated continuously according to the action attributes. Then periodically the background model and the three dimensional models in the world coordinate space are rendered from the viewpoints observers' eyes determined in accordance with the locations of the player character 803 with a line of sight determined in accordance with the orientations of the player character 803 in the world coordinate space so that the rendered images are mapped on the display. Thereby, the animation wherein the passenger car 803 which is a player character and another passenger car 801 which is a non-player character run along the course are displayed on the display screen.

In the CG animation generating process of such an ordinary running mode the CPU 51 periodically determines the game situation (Step 2002) and, and, as a result, when the running distance of the player character 803 in the world coordinate space exceeds a predetermined criterion of distance the player character 803 is assumed to have reached the goal and the racing game process is completed (Step 2003) after having the graphic system 60 display a completion message on the display screen.

When the 3D CG animation generating process of an ordinary running mode is initiated the CPU 51 periodically determines the above described game situation and, in addition, the operation lever 32a of the operation unit 20 is in a stand-by mode waiting for the reception of the operation from the player (Step 2005). That is to say, the CPU 51 determines whether or not the operation lever 32a of the operation unit 20 has received any operation from the player on basis of the XY coordinate value included in signals continuously outputted from the operation unit.

Figure 15:
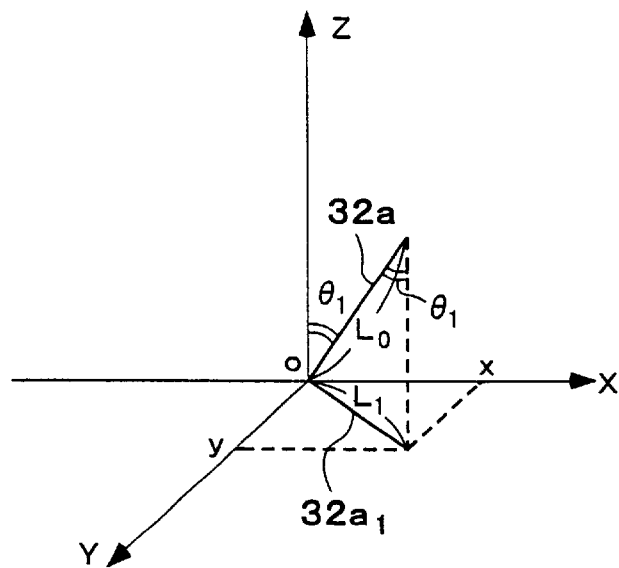
FIG. 15 is a diagram for explaining the detection principle of the angle of rotation of the operation lever provided in the analog operation part of the operation unit according to another mode of the present invention.
Figure 16:
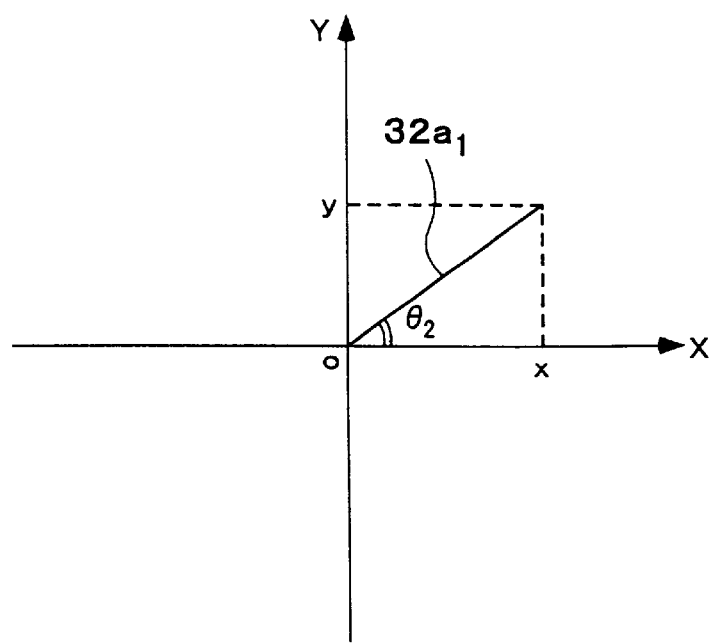
FIG. 16 is a diagram for explaining the detection principle of a tilt angle of the operation lever provided in the analog operation part of the operation unit according to another mode of the present invention.

Then, the CPU 51 calculates the tilt angle of the operation axis 32a made with the standard axis Z and the angle formed by the projected image of the operation lever 32a onto the XY plane and the X axis (hereinafter referred to as the absolute angle) respectively from the XY coordinate value included in the input signal from the operation unit 20 (Step 2006). More concretely, as shown in FIG. 16, the tangent value $\tan \theta_2$ of the absolute angle $\theta_2$ formed by the operation lever projection image $32a_1$ onto the XY plane and the X axis is calculated from the XY coordinate value (x, y) and, as shown in FIG. 15, the length $L_1$ of the operation lever projection image $32a_1$ onto the XY plane is calculated from the XY coordinate value (x, y) so that the sine value $\sin \theta_1$ of the tilt angle $\theta_1$ of the operation lever 32a made with the standard axis Z is calculated from the above length $L_1$ and the length $L_0$ of the operation lever 32a.

After that the CPU 51 determines whether or not the tilt angle $\theta_1$, which is a resultant calculation, is a predetermined criterion of angle $\theta_0$ or more (Step 2007). Thereby, the CPU 51 determines whether or not the operation lever 32a has received an operation of pressing to become tilted, that is to say, whether or not the operation lever is in neutral.

As a result, in the case that the tilt angle $\theta_1$ is less than a predetermined criterion of angle $\theta_0$ the CPU 51 determines that the operation lever is in neutral so as to set Nul for the standard angle variable. After that the CPU 51 further determines whether or not 0 degrees is set for the steering wheel relative angle variable (Step 2008).

Then, in the case that 0 degrees is set for the steering wheel relative angle variable, the CPU 51 again enters the waiting state for a signal from the operation unit 20 (Step 2005), and in the case that a value other than 0 degrees is set for the steering wheel relative angle variable the CPU 51 reduces the set point of the steering wheel relative angle variable (Step 2009) and then moves the animation to a later described steering wheel switching mode (Step 2017). Through such a process, the animation is displayed on the display screen as if the passenger car 803 which is a player character drives while the steering wheel is reverting back to the neutral position immediately after the player halted the operation of the operation lever and in the case that the player holds the operation of the operation lever for more than a predetermined time the animated image is displayed on the display screen as if the passenger car 803 which is a player character is running straight ahead.

On the other hand in the case that the tilt angle $\theta_1$ is a predetermined criterion of angle $\theta_0$ or more the CPU 51 further determines whether or not the standard angle variable is Nul (Step 2010).

Then, in the case that Nul is set for the standard angle variable the CPU 51 further determines whether or not 0 degrees is set for the steering wheel relative rotation angle variable (Step 2011).

In the case that 0 degrees is set for the steering wheel relative rotation angle variable, the CPU 51 newly sets the absolute angle $\theta_2$ which has been calculated in Step 2006 for the standard angle displacement value (Step 2012) and then again enters the waiting state for a signal from the operation unit 20 (Step 2005). In addition, in the case that a value other than 0 degrees is set for the steering wheel relative rotation angle variable the standard angle is calculated back to from the set point of the steering wheel relative angle variable. This standard angle calculated in this reverse operation is newly set for the standard angle variable (Step 2015) and then the animation is changed to the later described steering wheel switching mode (Step 2017).

In the case that an angle value is already set for the standard angle variable the CPU 51 calculates the difference between the set point of this standard angle variable and the absolute angle $\theta_2$ which has been calculated in Step 2006, that is to say, the CPU 51 calculates a relative operation lever rotation angle on the basis of the direction represented by the standard angle variable. Then the product between this operation lever rotation angle and a proper constant is calculated so that the calculated value is kept as the steering wheel relative rotation angle variable (Step 2016). As for the constant used here a reciprocal number 1/N of the frequency of rotation N of the operation lever which corresponds to one rotation of the steering wheel is set.

After that the CPU 51 controls the graphic system 60 so as to change the animation into a steering wheel switching mode (Step 2017). More concretely, in XY plane of the world coordinate space, while the three dimensional model of the non-player character 801 is made to run in accordance with the action attributes which have already been specified the orientation of the three dimensional model of the player character 803 is rotated in the direction shown by the angle corresponding to the steering wheel relative rotation angle kept at present from the direction shown by the standard angle kept at present. Then the background model or the three dimensional models in the world coordinate space are rendered from the viewpoint of observer's eye according to the locations of the player character 803 after the rotation with a line of sight determined according to the orientation of it so that the rendered image is mapped on the display screen. Thereby, the animation is displayed on the display screen as if the player is freely controlling the running direction of the passenger car 803.

Then when the 3D CG animation generating process of this steering wheel switching mode is completed, the graphic system 60 returns to the 3D CG animation generating process of an ordinary running mode. Furthermore in the case that the CPU 51 calculates the steering wheel rotation angle in sequence after that, it doesn't return to the 3D CG animation generating process of an ordinary running mode but the CG animation generating process of the steering wheel switching mode continues to be carried out based on a newly calculated steering wheel rotation angle.

In this way, according to the present mode, the player can operate the direction of movement of the player character on the display screen through the virtual operation of the steering of the real passenger car and, therefore, it becomes possible to increase the extent of entertainment value compared to the case where the direction of movement of the player character is operated by merely hitting the right and left operation buttons consecutively.

Though in the present mode the relative rotation angle of the operation lever from the start of rotation operation by the player is regarded as a relative rotation angle of the steering wheel of the passenger car 803 which is a player character so that the animation process of the steering wheel switching mode is performed, this is not always necessary but, the animation process of the steering wheel switching mode may be performed based on other information with respect to the rotation movement of the operation lever. For example, the rotation angular velocity of the operation lever is regarded as the rotation angular velocity of the steering wheel of the passenger car 803 which is a player character and then the animation process of the steering wheel switching mode may be performed or the frequency of rotation or speed of rotation of the operation lever is regarded as the rotation frequency or the rotation speed of the steering wheel of the passenger car 803 which is a player character and then the animation process of the steering wheel switching mode may be performed.

Though here only one of the operation lever 32a of the operation unit is utilized for the operation of the running conditions of the passenger car 803 which is a player character it is not necessarily limited to this. For example, the other operation lever 31a may be regarded as an operation apparatus other than the steering wheel such as a shift lever so that the operation received by this operation lever 31a is reflected in the running conditions of the passenger car 803 which is a player character.

As described above, according to the present invention, it is possible to broaden the applications of the operation unit provided with an operation lever as an input unit in an entertainment unit. Then the same effects can be gained in the case where the present invention is applied to any type of entertainment unit so far as it is a unit which can operate player characters or the like displayed on the display screen of the display unit in accordance with the contents of the user's operation received via an operation unit provided with an operation lever such as a joystick. For example, the present invention can be widely applied to game units, information processing units which can implement a variety of application programs (including programs other than game applications) or the like so as to be able to gain the same effects.

What is claimed is:

1. An entertainment unit used by being connected to an operation unit, having an operation stick, and to a display unit, with the entertainment unit being characterized by comprising:
   a means for performing a process of generating an image of an object so as to be displayed on a display screen of a display unit;
   a means for receiving a signal indicating the location of a point displaced in accordance with an operation received by said operation stick from said operation unit;
   a means for calculating a displacement amount according to an angular displacement of the point around a preset coordinate origin based on said signal showing the position of the point;
   a means for calculating a distance from the preset coordinate origin based on said signal showing the location of said point; and
   a means for setting an evaluation value for an operation object based on said distance and said calculated displacement amount;
   wherein said means for performing a process of displaying an image of said object alters the condition of said operation object among the objects displayed on said display screen based on said calculated displacement amount.

2. An entertainment unit according to claim 1, wherein the evaluation value is incremented when said distance is less than a predetermined value.

3. An entertainment unit according to claim 1, wherein said means for performing a process of displaying the image of the object generates a first index object, showing a distance from said coordinate origin, and a second index object, showing said displacement amount, which are, respectively, displayed on the display unit.

4. An entertainment unit according to claim 3 characterized in that said means for carrying out a process of displaying the image of the object, in the case that the entertainment unit executes a game program, displays the object indicating a character appearing in the game and displays said first index object and said second index object with respect to said character while causing correspondence to said character synchronized to particular action.

5. An entertainment unit according to claim 3 characterized in that said means for carrying out a process of displaying the image of the object, in the case that the distance from the coordinate origin varies as time passes, changes the display condition of the first index object corresponding to a variation of said distance from the coordinate origin and, changes the display condition of the second index object corresponding to a variation of said evaluation value.

6. An entertainment unit according to claim 5 characterized in that said means for performing a process of displaying the image of the object, in the case that the entertainment unit executes a game program, displays the object indicating a character appearing in the game and displays said first index object and said second index object with respect to said character while causing correspondence to said character synchronized to particular actions.

7. An entertainment unit for processing objects on a display screen of a display unit characterized by comprising:
   an input reception means connected to an operation unit having an operation axis which is rotatable under the condition tilted from the standard posture, which receives an input of location information of said operation stick from said operation unit;
   an operation means which sequentially calculates tilt angles of said operation stick formed with a preset standard axis based on said location information of the operation stick and which calculates a variable associated with a rotation movement of said operation stick around a preset standard axis while said tilt angle exceeds a predetermined criterion of angle after said tilt angle exceeds once the predetermined criterion of angle; and
   an image processing means for changing the conditions of said objects based on the variable calculated by said operation means.

8. An entertainment unit according to claim 7, wherein said variable associated with the rotation movement of the operation stick includes at least one among the following: a rotation angle, a rotational speed and a rotation frequency of said operation stick around said standard axis.

9. An entertainment unit for operating an operation object on a display screen of a display unit in accordance with contents of the operation received via an operation unit having an operation stick which is formed so as to be able to be rotated around a predetermined axis passing through a predetermined fulcrum so to be able to be tilted with said fulcrum as the center and under a tilted condition, characterized by comprising:

a parameter setting means for setting a first parameter with respect to said operation object according to the tilt angle of said operation stick formed with said predetermined axis and for setting a second parameter according to one among the following: a rotation angle, a rotational speed and a rotation frequency of said operation stick around said standard axis; and an evaluation value setting means for setting an evaluation value for said operation object based on said first and second parameters set by said parameter setting means and for changing the evaluation value set with respect to said operation object in the case that said first parameter set by said parameter setting means is less than a predetermined value.

10. An entertainment unit according to claim 9 characterized in that, in the case that the evaluation value set with respect to said operation object is changed by said evaluation value setting means when said first parameter is less than a predetermined value, the display contents of said operation object and/or said other display object on a display screen of said display unit are changed.

11. An entertainment unit according to claim 9 characterized in that:

said operation unit comprises a means for receiving an instruction specifying another displayed object associated with said operation object which is a displayed on a display screen of said display unit from the operator; and only in the case that said instruction is inputted into said operation unit said parameter setting means set said first and second parameters and in the case that said instruction is not inputted the display contents said operation object on a display screen of said display unit of are changed in accordance with the operation contents of said operation stick by the operator.

12. An entertainment unit according to claim 11 characterized in that, in the case that the evaluation value set with respect to said operation object is changed by said evaluation value setting means when said first parameter is less than a predetermined value, the display contents of said operation object and/or said other display object on a display screen of said display unit are changed.

13. A storage medium which records a program to be loaded into an entertainment unit used by being connected to an operation unit, having an operation stick, and to a display unit, wherein said program is characterized by making said entertainment unit implement: a means for performing a process of generating an image of an object and of displaying the image on a display screen of the display unit;

a means for receiving a signal showing the location of a point displaced in accordance with the operation received by said operation stick from said operation unit;

a means for calculating a displacement amount based on an angular displacement of the point around a preset coordinate origin based on the signal showing the location of said point; and a means for calculating a distance from the preset coordinate origin based on said signal showing the location of said point; and a means for setting an evaluation value for an operation object based on said distance and said calculated displacement amount;

wherein said means for performing a process of displaying the images of the object changes the display condition with respect to said operation object among the objects displayed on said display screen based on said calculated displacement amount.

14. A storage medium according to claim 13, wherein the evaluation value is incremented when said distance is less than a predetermined value.

15. A storage medium according to claim 13, wherein said means for performing a process of displaying the images of the objects generates a first index object indicating said distance from said coordinate origin and a second index object indicating said displacement amount which are, respectively, displayed on the display unit.

16. A storage medium according to claim 15 characterized in that said means for performing a process of displaying the image of the object, in the case that the distance from the coordinate origin varies as time passes, changes the display condition of the first index object corresponding to a variation of said distance from the coordinate origin and, changes the display condition of the second index object corresponding to a variation of said evaluation value.

17. A storage medium according to claim 16 characterized in that said means for performing a process of displaying the image of the object, displays the object indicating a character appearing and displays said first index object and said second index object with respect to said character while causing correspondence to said character synchronized to particular action.

18. A storage medium according to claim 15 characterized in that said means for performing a process of displaying the image of the object, displays the object indicating a character appearing and displays said first index object and said second index object with respect to said character while causing correspondence to said character synchronized to particular action.

19. A storage medium which records a program to be loaded into an entertainment unit used by being connected to an operation unit, having an operation stick, and to a display unit, wherein said program is characterized by making said entertainment unit implement:

a means for performing a process of generating an image of an object and of displaying the image on a display screen of the display unit;

a means for receiving a signal showing the location of a point displaced in accordance with the operation received by said operation stick from said operation unit;

a means for calculating a displacement amount based on an angular displacement of the point around a preset coordinate origin based on the signal showing the location of said point; and means for calculating a distance from the preset coordinate origin based on said signal showing the location of the point;

wherein said means for performing a process of displaying the image of the object changes the display condition with respect to an operation object among the objects displayed on said display screen based on said calculated displacement amount;

and wherein said means for calculating a displacement amount calculates said displacement amount created while the point locates within a range outside a predetermined distance after said point reaches said range.

20. An entertainment unit used by being connected to an operation unit, having an operation stick, and to a display unit, with the entertainment unit being characterized by comprising:

a means for performing a process of generating an image of an object so as to be displayed on a display screen of a display unit;

a means for receiving a signal indicating the location of a point displaced in accordance with an operation received by said operation stick from said operation unit;

a means for calculating a displacement amount according to an angular displacement of the point around a preset coordinate origin based on said signal showing the position of the point; and a means for calculating a distance from the preset coordinate origin based on the signal showing the location of said point;

wherein said means for performing a process of displaying an image of said object alters the condition of an operation object among the objects displayed on said display screen based on said calculated displacement amount;

wherein said means for calculating the displacement amount calculates said displacement amount created while the point locates within a range outside of a preset distance from the coordinate origin position after said point reaches the range.

21. A storage medium which stores a program for making an entertainment unit which receives, from an operation unit having an operation stick which is rotatable under a condition tilted from the standard posture, an input in accordance with a operation received by said operation stick, implement a display process of objects on a display screen of a display unit, with the storage medium being characterized in that:

in said display process, said entertainment unit implements;

a first step of calculating a tilt angle of said operation stick and calculating a variable associated with a rotation movement of said operation stick around a preset standard axis based on location information of said operation stick included in input information from said operation unit while said tilt angle exceeds a predetermined criterion of angle after said tilt angle exceeds once the predetermined criterion of angle; and a second step of changing the conditions of said objects based on said variable calculated in said first step.

22. A storage medium storing a program which is loaded and is executed by a unit that is able to execute a program, with the storage medium being characterized in that:

said program operates an operation object on a display screen of a display unit in accordance with contents of the operation received via an operation unit having an operation stick which is formed so as to be able to be rotated around a predetermined axis passing through a predetermined fulcrum so to be able to be tilted with said fulcrum as the center and under a tilted condition, and said program makes said unit implement;

a first step of setting a first parameter with respect to said operation object according to the tilt angle of said operation stick formed with said predetermined axis and of setting a second parameter according to one among the following: a rotation angle, a rotational speed and a rotation frequency of said operation stick around said standard axis; and a second step of setting an evaluation value for said operation object based on said first and second parameters set by said parameter setting means and of changing the evaluation value set with respect to said operation object in the case that said first parameter set by said parameter setting means is less than a predetermined value.

23. A parameter setting method for setting a parameter in accordance with contents of the operation received via an operation unit having an operation stick which is formed so as to be able to be rotated around a predetermined axis passing through a predetermined fulcrum so to be able to be tilted with said fulcrum as the center and under a tilted condition, characterized by comprising:

a first step of setting a first parameter according to the tilt angle of said operation stick formed with said predetermined axis;

a second step of setting a second parameter according to a rotation angle or a rotational speed of said operation stick; and a third step of setting an evaluation value for operation objects based on said first and second parameters and of changing the evaluation value set with respect to said operation objects in the case that said first parameter is less than a predetermined value.

24. A method for making an entertainment unit, which receives, from an operation unit having an operation stick which is able to receive a rotation operation around a standard axis under a condition tilted from the standard position, an input in accordance with the operation received by said operation stick, implement a display process of object on a display screen of a display unit, with the method being characterized by comprising:

a first step wherein said entertainment unit calculates a tilt angle of said operation stick and calculates a variable associated with a rotation movement of said operation stick around said standard axis based on location information of said operation stick included in input information from said operation unit while said tilt angle exceeds a predetermined criterion of angle after said tilt angle exceeds once the predetermined criterion of angle; and a second step wherein said entertainment unit changes the conditions of said object based on said variable calculated in said first step.

* * * * *